United States Patent
Richter et al.

(10) Patent No.: US 10,584,225 B2
(45) Date of Patent: Mar. 10, 2020

(54) PRODUCTION OF FINE-PORED PMMA FOAMS USING NUCLEATING AGENTS

(71) Applicant: Evonik Roehm GmbH, Darmstadt (DE)

(72) Inventors: Thomas Richter, Darmstadt (DE); Christoph Seipel, Babenhausen (DE); Kay Bernhard, Darmstadt (DE); Sivakumara K Krishnamoorthy, Pfungstadt (DE); Sebastian Buehler, Freiburg (DE)

(73) Assignee: Evonik Roehm GmbH, Darmstadt (DE)

( * ) Notice: Subject to any disclaimer, the term of this patent is extended or adjusted under 35 U.S.C. 154(b) by 0 days.

(21) Appl. No.: 15/558,605

(22) PCT Filed: Mar. 24, 2016

(86) PCT No.: PCT/EP2016/056477
§ 371 (c)(1),
(2) Date: Sep. 15, 2017

(87) PCT Pub. No.: WO2016/156172
PCT Pub. Date: Oct. 6, 2016

(65) Prior Publication Data
US 2018/0079882 A1   Mar. 22, 2018

(30) Foreign Application Priority Data
Mar. 31, 2015   (EP) .................................... 15161905

(51) Int. Cl.
| | | |
|---|---|---|
| C08J 9/00 | (2006.01) | |
| C08J 9/236 | (2006.01) | |
| C08J 9/02 | (2006.01) | |
| C08J 9/14 | (2006.01) | |
| C08F 2/38 | (2006.01) | |
| C08J 9/06 | (2006.01) | |
| C08K 3/36 | (2006.01) | |
| C08K 5/00 | (2006.01) | |
| C08L 33/12 | (2006.01) | |

(52) U.S. Cl.
CPC ................ C08J 9/236 (2013.01); C08F 2/38 (2013.01); C08J 9/008 (2013.01); C08J 9/02 (2013.01); C08J 9/06 (2013.01); C08J 9/142 (2013.01); C08K 3/36 (2013.01); C08K 5/0083 (2013.01); C08L 33/12 (2013.01); C08J 2201/026 (2013.01); C08J 2203/12 (2013.01); C08J 2205/044 (2013.01); C08J 2205/046 (2013.01); C08J 2205/10 (2013.01); C08J 2207/00 (2013.01); C08J 2333/12 (2013.01); C08L 2203/14 (2013.01)

(58) Field of Classification Search
CPC ................................. C08J 9/008; C08L 33/12
See application file for complete search history.

(56) References Cited

U.S. PATENT DOCUMENTS

| | | | | |
|---|---|---|---|---|
| 3,673,129 | A * | 6/1972 | Sagane | C08F 20/42 |
| | | | | 521/50.5 |
| 4,419,459 | A | 12/1983 | Melchior | |
| 4,816,492 | A | 3/1989 | Schiller et al. | |
| 4,983,640 | A * | 1/1991 | Moll | B22C 7/023 |
| | | | | 521/60 |
| 2006/0217484 | A1* | 9/2006 | Tanimoto | C08F 20/12 |
| | | | | 524/556 |
| 2007/0243369 | A1* | 10/2007 | Park | C04B 26/06 |
| | | | | 428/304.4 |
| 2012/0225272 | A1* | 9/2012 | Costeux | C08J 9/0023 |
| | | | | 428/220 |
| 2014/0221512 | A1 | 8/2014 | Costeux et al. | |

FOREIGN PATENT DOCUMENTS

| | | |
|---|---|---|
| EP | 0 032 720 B1 | 7/1985 |
| EP | 0 068 439 B1 | 2/1987 |
| EP | 1167445 A * | 1/2002 |
| FR | 1.423.844 A | 1/1966 |
| IL | 62693 A | 11/1984 |
| JP | 48-43054 A | 6/1973 |
| JP | 55-139433 A | 10/1980 |
| JP | 2002-3635 A | 1/2002 |
| JP | 2006-45256 A | 2/2006 |
| JP | 2010-18647 A | 1/2010 |
| JP | 2012-201704 A | 10/2012 |
| JP | 2012-201705 A | 10/2012 |
| JP | 2013-75935 A | 4/2013 |
| WO | 2013/048760 A1 | 4/2013 |

OTHER PUBLICATIONS

US 4,443,391 A, 04/1984, Melchior (withdrawn)
Translation of EP 1167445 (Year: 2002).*
Machine Translation of JP 2001-164026 by Kato et al. (Year: 2001).*
International Search Report dated Jun. 6, 2016 in PCT/EP2016/056477 filed Mar. 24, 2016.
European Search Report dated Aug. 28, 2015 in European Application 15161905.3 filed Mar. 31, 2015.
Stéphane Costeux et al., "Low density thermoplastic nanofoams nucleated by nanoparticles", Polymer, Mar. 28, 2013, vol. 54, No. 11, pp. 2785-2795, XP028589328.

* cited by examiner

*Primary Examiner* — Kara B Boyle
*Assistant Examiner* — Christina H. W. Rosebach
(74) *Attorney, Agent, or Firm* — Oblon, McClelland, Maier & Neustadt, L.L.P.

(57) ABSTRACT

Fine-cell PMMA foams are produced using a production process including nucleators in addition to suitable blowing agents. It was found that, surprisingly, a simple-to-produce stable PMMA foam having very fine cells and very good properties can be produced.

9 Claims, No Drawings

PRODUCTION OF FINE-PORED PMMA FOAMS USING NUCLEATING AGENTS

FIELD OF THE INVENTION

The present invention relates to novel types of fine-cell PMMA foams and also to the production thereof. The recipes used in the production process include nucleating agents in addition to suitable blowing agents. It was found that, surprisingly, the invention provides a simple-to-produce stable PMMA foam having very fine cells and very good properties.

PRIOR ART

Rigid polymeric foams are commonly/generally known and are widely used, for example as insulating material, in packaging and also in lightweight construction. The foams should have high strengths coupled with low density when used in lightweight construction in particular. The foams used therein include PVC, PET, specific PU and P(M)I (poly(meth)acrylamide) foams, and they are used inter alia as core material in sandwich composites.

PMMA foams are extensively described in the literature, but have hitherto achieved little if any industrial significance. One reason is the frequently described, but very complicated production via autoclave processes in which PMMA is loaded with gaseous blowing agents, e.g. $CO_2$ or $N_2$, under high pressures in an autoclave and then expanded by release of pressure. Rigid PMMA foams blown with a blowing agent added to the monomer before polymerization and dissolved in the polymer after polymerization are little described, by contrast. Nonetheless, PMMA foams are by virtue of their strength and weathering resistance potentially very interesting engineering materials for lightweight construction. Very fine-cell PMMA foams would be of particular interest. Materials of this kind should be very strong while also having a low weight and other good mechanical properties.

Sekisui has a number of patent applications describing the production of "acrylic foams" (e.g. JP 48043054, JP 2002003635, JP 2006045256, JP 2012201704, JP 2012201705, JP 2013075935). However, these patent applications describe distinct amounts of styrene and/or methacrylamides as comonomers in addition to MMA. The blowing agent used is predominantly urea. Urea as a blowing agent, however, can lead to problems due to poor solubility in the monomer mixture, and this can in turn lead to inhomogeneity in the foam and foreclose the formation of small cells. JP 2010018647 is the only one of the patent applications cited to reference cell sizes between 1 and 2 mm. A further disadvantage with urea as blowing agent is that it acts as a blowing agent by virtue of its decomposition into CO and $NH_3$. So the foaming temperature always has to be above the decomposition temperature of urea, greatly curtailing the scope for varying the foaming temperature. Furthermore, $NH_3$ and CO are toxic. In addition, these foams in principle comprise relevant amounts of styrene and/or methacrylamide as comonomers in the production process.

JP 55139433 describes the production of a foam containing between 4 and 35 wt % of acrylic and/or methacrylic acid as comonomer as well as urea and water as blowing agent. This is not a PMMA foam in the true sense. Cell size is not reported, but is likewise likely to be on the rather large side because of the urea used.

U.S. Pat. No. 4,816,492 describes the production of (meth)acrylate-based foams wherein the monomer mixture is polymerized in the presence of blowing agents. The blowing agents used are halogenated hydrocarbons. Halogenated hydrocarbons, however, are problematic in that they have a severely adverse effect on the ozone layer and therefore are subject to significant restrictions. Furthermore, there are restrictions on the degrees of freedom in the foaming operation in that cell size, cell distribution and foam density are adjustable only to a limited extent and not independently of each other. Cell sizes are reported as above 1 mm.

IL 62693A and EP 0 032 720 describe the production of a foamed PMMA intentionally having very coarse cells. Production proceeds via swelling in MMA of PMMA bead polymers comprising blowing agent and the subsequent expanding and polymerizing with expansion taking place before curing. The blowing agent is chosen so as to blow the PMMA beads at a temperature below that which would cause the still liquid, reactive resin to polymerize. The focus is all the while on producing a polymeric foam that is transparent. One issue with this process is that the polymerization is not yet complete at the time of foaming and therefore the cells only become successfully stabilized within very narrow processing parameter limits. This results in very coarse cells having a diameter of several millimetres and a wide cell size distribution.

EP 0 068 439 discloses the production of PMMA-based foams by polymerization of MMA in the presence of a blowing agent and subsequent foaming. It must be emphasized here that a plasticizing agent, in particular a methacrylic ester having three or more carbon atoms in the alkyl group, is used in amounts between 5 and 40 parts by weight, based on MMA, explicitly to obtain foams. The blowing agents are said to be hydrocarbons and/or (hydro)fluoro carbons. The purpose is to produce foams having large cells of, for example, about 5 mm diameter and thus retain the transparency of the base polymer in contradistinction to more finely cellular foams. However, the comparatively long-chain alkyl moieties have a flexibilizing effect on the matrix polymer that is mechanically unwelcome for rigid foam applications in particular. Halogenated hydrocarbons are further also among the blowing agents described. The teaching of EP 0 068 439 is likewise but limited to very large cells in the foam matrix.

FR 1423844 describes the production of PMMA that contains bubbles, wherein the blowing agent used is AIBN, which also acts as the initiator for the polymerization. The concentration of initiator is accordingly high and so the molar mass of the matrix polymer in the foam is very low. The very low molar mass in turn has adverse consequences for the mechanical properties of the foam. The exemplified foams, however, have but a low number of unevenly distributed cells. The densities obtained are also not reported.

Fine cellularity in a PMMA foam would be of considerable importance for various applications. In insulating applications, the insulating effect of a foam generally increases with decreasing cell size for the same density and cell gas. In lightweight construction applications where a foam core is faced with resin-impregnated outer layers, resin absorption by the foam core should be minimal to save weight. The finer the cells are of the closed-cell foam used for this purpose, the less the amount of resin absorbable. However, the prior art does not appear to disclose any methods of making PMMA foams that have a cell size distinctly below 1 mm.

Small cell sizes below 1 mm are solely conceivable in an autoclave process without special addition of blowing agent.

However, such a process has very demanding equipment requirements and is scarcely suitable for a large manufacturing throughput.

It is known from the production of other foams, such as PMI, PVC or PP foams, that fine cells are obtainable during foaming via a) a high nucleating rate, i.e. a fast and high rate of supersaturation with blowing agent, or b) so-called nucleating agents (heterogeneous nucleation).

High nucleating rates are obtained by rapid supersaturation of the blowing agent in the polymer matrix, for example by a quasi instantaneous drop in the ambient pressure to far below the vapour pressure of the blowing agent at the foaming temperature or by a very rapid temperature increase to far above the boiling temperature of the blowing agent. Neither is sufficiently possible in relation to PMMA to obtain the desired cell sizes in a process wherein the blowing agent is admixed before polymerization. This is inter alia attributable to the melt viscosity of PMMA and the low ceiling temperature of PMMA. These approaches are further very demanding as regards equipment and at best allow small-scale manufacture at low throughput.

As nucleating agents for heterogeneous nucleation there may be used, for example, finely divided substances. These particles facilitate the formation of cells. However, it must be borne in mind that these particles can also have a contrary effect in that they destroy, "pierce" as it were, the nascent cell walls during the foaming process, thus enlarging the cells by coalescence. These fine-scale particles can further cause matrix polymer flowability to decrease, compromising the foamed expansion. No suitable nucleating agents are accordingly known for PMMA in particular.

Problem

The problem addressed by the present invention was therefore that of providing a novel process for producing fine-cell PMMA foams having an ASTM D 3576 average cell size below 500 µm without the discussed disadvantages of the prior art.

The central purpose of the present invention here was to identify nucleating agents for PMMA foaming which are suitable for producing these very finely cellular PMMA foams. The purpose was thus to find a suitable nucleating agent which does not hinder the foamed expansion and is dispersible in the batch solution to very good, homogeneous and stable effect as well as leading to the abovementioned cell sizes.

The problem addressed by the present invention for this purpose was in particular that of providing a PMMA recipe which is readily foamable while allowing high degrees of freedom with regard to the establishment of cell size in the region of small cells, cell distribution and foam density. On the other hand, the foamed material shall have a very high level of mechanical strength.

The problem addressed by the present invention in this regard was in particular that of providing PMMA foams having an overall cell size below 500 µm and a foam density below 250 kg/m³.

This process shall further eschew blowing agents that are toxic and/or environmentally harmful and/or have a high ODP (ozone depletion potential), as is for example the case with most (hydro)halocarbons.

Further problems addressed without explicit recitation thereof may become apparent from the overall context of the invention, from the claims, from the description or from the examples.

Solution

The problems are solved by a novel type of process for producing PMMA foams, which comprises producing said foams by a polymerization, as by a slab polymerization for example, of monomer mixtures containing predominantly MMA and/or of a syrup consisting of a polymer consisting wholly or predominantly of MMA and a monomer mixture composed wholly or predominantly of MMA, in the presence of a nucleating agent and of a blowing agent that is non-gaseous under polymerization conditions. The fully polymerized PMMA slab thus obtained, which is laden with blowing agent, is then foamed up in a second step by heating while small and uniform cells are formed by the admixed nucleating agent.

This process is particularly characterized in that the nucleating agent comprises silicon oxide particles having a diameter between 4 and 1000 nm. The composition in question contains from 0.01 to 2.0 wt %, preferably from 0.2 to 1.5 wt % of one or more initiators, from 2 to 20 wt %, preferably from 3 to 15 wt % of one or more blowing agents, from 0.2 to 10 wt %, preferably from 0.5 to 8 wt % of the silicon oxide particles with the diameter between 4 and 1000 nm, preferably between 5 and 500 nm, and from 70 to 97.79 wt %, preferably from 75 to 97.8 wt % of a polymer-forming mixture, wherein said polymer-forming mixture consists of MMA and/or MMA repeat units to an extent of not less than 75 mol % and may be present as polymer and/or oligomer to an extent of from 0 to 80 wt %, preferably to an extent of from 0 to 50 wt %. This composition is initially polymerized at a temperature between 20° C. and 100° C., preferably between 30° C. and 70° C., and subsequently foamed at a temperature between 130° C. and 250° C., preferably between 150° C. and 230° C. In addition to the recited components, the composition may contain up to 27.79 wt % of further components. Examples of these further components are, in particular, further polymeric components other than polymers comprising MMA, UV stabilizers, fillers and pigments.

The silicon oxide particles are preferably $SiO_2$ particles. However, it is also possible that the stoichiometry of these particles is not precisely 1:2. Very small particles in particular may differ from said stoichiometry by up to 30%. It is also possible for up to 20% of the silicon to be replaced by other ions of a metal, as of aluminium for example. The only important requirement for the purposes of the present invention is that the stoichiometric ratio of silicon to oxygen be between 0.7 and 1.3:2, and that silicon comprise not less than 80 mol % of non-oxygen atoms in the particle.

The polymer-forming mixture in addition to MMA may include up to 25 wt % of further components. These further components may comprise MMA-copolymerizable monomers, chain transfer agents and/or crosslinkers. The copolymerizable monomers as well as MMA may be fully used therein as monomers. The polymer-forming composition may contain in particular up to 0.5 wt % of crosslinker and/or up to 1.5 wt % of chain transfer agent.

In a more conveniently handleable embodiment of the invention, however, it is also possible for up to 80 wt %, preferably not more than 50 wt % of the MMA and the copolymerizable monomers to be present as polymer and/or oligomer. The advantage of such a syrup, consisting of monomers and polymers/oligomers, is that it has a higher viscosity than a purely monomeric mixture and develops a lower vapour pressure in the polymerization.

The MMA-copolymerizable monomers may comprise in particular acrylates, such as, in particular, methyl acrylate, ethyl acrylate, propyl acrylate or n-butyl acrylate. The copolymerization of acrylates serves to additionally stabilize the foam at high foaming temperatures in particular, since these foaming temperatures may be above the ceiling temperature of straight MMA. When no stabilizing comonomers are incorporated, a shorter foaming time or a correspondingly lower foaming temperature is preferable.

Further examples of suitable comonomers are (meth) acrylic acid, methacrylates, such as ethyl methacrylate, propyl methacrylate, n-butyl methacrylate, tert-butyl (meth) acrylate, isopropyl (meth)acrylate, isobutyl (meth)acrylate, styrene, (meth)acrylamide, an N-alkyl(meth)acrylamide having 1 to 12 carbon atoms in the alkyl group, a hydroxyalkyl (meth)acrylate having 1 to 4 carbon atoms in the alkyl group, a polyether (meth)acrylate where the polyether may have a molecular weight between 200 and 5000. These comonomers may also take the form of a mixture of two or more thereof. When these comonomers comprise n-butyl (meth)acrylate and/or n-propyl (meth)acrylate, the proportion of the overall composition attributable to them may not exceed a combined 3 wt %.

Crosslinkers used preferably comprise a di-, tri- or tetra (meth)acrylate, allyl (meth)acrylate, triallyl cyanurate, triallyl isocyanurate or a mixture containing two or more thereof.

Chain transfer agents used preferably comprise a compound having from one to five mercaptan groups, a γ-terpinene or a mixture of two or more thereof. The chain transfer agent comprises with particular preference pentaerythritol tetrathioglycolate, 2-mercaptoethanol, an alkyl mercaptan having from 2 to 12 carbon atoms, thioglycolic acid, a thioglycolate, γ-terpinene or a mixture of two or more thereof.

A particularly important aspect of the present invention is that of using the nucleating agents in the composition to be foamed. This use of nucleating agents in the manufacture of PMMA foams is novel over the prior art and has the surprising effect that the PMMA foams are obtained with particularly small and uniform and also uniformly distributed cells. Fine cellularity thus obtained is of considerable importance for various applications. In insulating applications, the insulating effect of a foam generally increases with decreasing cell size for the same density and cell gas. In lightweight construction applications where a foam core is faced with resin-impregnated outer layers, resin absorption by the foam core should be minimal to save weight. The finer the cells are of the closed-cell foam used for this purpose, the less the amount of resin absorbable.

It was found that, surprisingly, a distinctly more fine-cell foam is obtainable with use of silicon oxide particles as compared with a foam based on a base recipe without nucleating agent. AEROSIL OX50 (from EVONIK Industries AG) provides a very finely cellular foam for instance. It was further found that, surprisingly, no such effect was obtained with other potentially nucleating additives such as, for example, talcum powder. On the contrary, talcum tends to interfere with the foaming process, any foam obtained being highly inhomogeneous. The use of $Al_2O_3$ particles (AEROXIDE ALU C from EVONIK Industries AG) likewise did not yield any success, since foaming was impossible here. This shows that merely the importation of just any particles in the PMMA foam production process shown herein does not bring about the desired degree of cellular refinement, in that instead, surprisingly, initially only silicon oxide particles appear to be suitable therefor.

The PMMA foams obtained according to the present invention further have a surprisingly high strength and also a surprisingly low brittleness and therefore can, for example, find application in lightweight construction. By reason of the good properties of the material it is further possible to eschew the employment of plasticizers, e.g. comparatively long-chain alkyl (meth)acrylates or phthalates, which as far as is known to date have a positive effect on the flowability and/or foamability, yet at the same time cause the mechanical properties of the PMMA foam, in particular its strength, to be adversely affected.

Particularly suitable blowing agents comprise tert-butanol, n-heptane, MTBE, methyl ethyl ketone, an alcohol having from one to four carbon atoms, water, methylal, urea, isopropyl (meth)acrylate and/or tert-butyl (meth)acrylate. When isopropyl (meth)acrylate and/or tert-butyl (meth)acrylate are/is used they are/is at the same time part of the recited monomer composition and are initially wholly or partly copolymerized into the polymers formed therefrom. In the course of the foaming step, (meth)acrylic acid repeat units are formed in the polymer by elimination of, respectively, propene and isobutene. Polymers derived from large proportions of these monomers or completely from these monomers are also usable in a special embodiment. The use of such polymerizable and/or polymerized comonomers that release blowing agents enables particularly small and regular cells to be obtained, for example.

Particularly suitable blowing agents are tert-butyl (meth) acrylate, isopropyl (meth)acrylate, tert-butanol, isopropanol, tert-butyl methyl ether and poly(tert-butyl (meth)acrylate).

The polymerization is preferably carried out in a shape-conferring vessel, in particular in the form of a chamber polymerization between two plates, for example glass plates. A rectangular bowl may be concerned in the simplest case for example. The polymerization in such a bowl will later result in a slab, the thickness of which was dictated by the fill level of the bowl and the distance between the plates. In addition, however, more complex shapes are conceivable for the vessel. The polymerization is preferably carried out at a temperature between 30 and 70° C. Useful initiators include not only commonly/generally known free-radical initiators, for example peroxides or azo initiators, but also redox systems or UV initiators. Polymerization temperatures below 40° C. apply particularly to these redox systems and UV initiators. UV initiators are initiated by irradiation with appropriate UV light, while redox initiators comprise two-component systems initiated by mixing the two components and the monomers.

Foaming may subsequently take place in the same vessel, in which case the volume increase is restricted to one direction, the open side of the vessel. Yet the polymerized material is also foamable without confining enclosure. Foaming is preferably carried out in an oven. Alternatively, foaming may be effected by irradiation with IR radiation, in particular at a wavelength between 0.78 and 2.20, preferably between 1.20 and 1.40 µm. Microwave foaming represents a further alternative. The combination of various methods, such as IR radiation, microwaves and/or heating in an oven is also conceivable.

Foaming as well as the prior polymerization may each be carried out in a plurality of temperature stages. The temperature may be raised later in the polymerizing step to additionally enhance the conversion and thereby reduce the residual monomer content. In the foaming step, a stagewise increase in the foaming temperature may be used to influence cell distribution, cell size and cell count.

Optionally, the process may also be carried out by performing the polymerization only incompletely, in this case preferably to a conversion of not less than 80%, and effecting the full, final polymerization in the course of the foaming step. Such a process has the advantage that the comparatively short polymer chains and the remaining monomers have a flexibilizing effect at the start of the foaming operation without apparently any flexibilizing compound remaining in the final foam. Therefore, in such an embodiment, the polymerization and the foaming would take place simultaneously to some extent—at one foaming temperature.

As well as the process, the present invention also provides PMMA foams obtainable via such a process for example. Such a PMMA foam is characterized in that the solid fraction of this foam contains from 72 to 98 wt % of a polymer incorporating not less than 75 mol % of MMA repeat units, and 0.2 to 12.5 wt % of silicon oxide particles. The foam further has a density between 25 and 250 kg/m$^3$, preferably between 40 and 250 kg/m$^3$, and an average cell size below 500 μm. Overall cell size is preferably below 500 μm. This is to be understood as meaning that there are no cells having a diameter above 500 μm.

Cell size is determined in accordance with the ASTM D 3576 standard bar the following departures therefrom: It is first of all not a blade-cut section of the PMMA foam which is viewed, but a broken edge thereof. Further, on account of the relatively small cells, counting is done not by means of an optical microscope, but via a scanning electron microscope measurement. The calculation of the cell size from the pictures obtained is standard compliant, however.

Preference is given in particular to PMMA foams in which the polymer was formed exclusively from MMA, an initiator, one or more crosslinkers selected from di-, tri- or tetra(meth)acrylates, allyl (meth)acrylate, triallyl cyanurate and/or triallyl isocyanurate, and one or more chain transfer agents selected from compounds having from one to five mercaptan groups and/or γ-terpinene, preferably selected from pentaerythritol tetrathioglycolate, 2-mercaptoethanol, alkyl mercaptans having from 2 to 12 carbon atoms, thioglycolic acid, thioglycolate and/or γ-terpinene.

The PMMA foams according to the present invention as well as the PMMA foams obtained according to the present invention are useful for many and varied purposes. Examples of such uses are weathering-resistant insulating materials, core material for sandwich composites, in lightweight construction, as packaging material, as energy absorbers in crash elements, in architectural building elements, as diffuser in lighting applications, in furniture construction, in boat construction, in vehicle construction, in the aerospace industry or in model building.

EXAMPLES

Example 1

In this example, foaming was done with a blowing agent in the form of a constituent part of a polymer.

A mixture of 266.25 g of a polymethacrylate prepared exclusively from MMA, 1065.00 g of MMA, 0.75 g of 2,2'-azobis(2,4-dimethylvaleronitrile), 0.60 g of pentaerythritol tetrathioglycolate as chain transfer agent, 15.00 g of n-butyl acrylate, 105.00 g of tert-butyl methacrylate, 1.50 g of Rewopol SB-DO 75 release agent and 0.90 g of ethylene glycol dimethacrylate as crosslinker was prepared. Into this mixture were then stirred 45.00 g of AEROSIL OX50 nucleating agent, by the complete addition being followed by a further 20 min of stirring and subsequent dispersing using an UltraTurrax (2 min at 3000 rpm, 1 min at 5000 rpm). This mixture was subsequently polymerized at 42° C. for 24 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 215° C. for 1.5 h. The mixture foamed very well and the distribution of the cells was uniform. The foam obtained had a density of about 100 kg/m$^3$ and very fine cells having an average diameter of 250 μm.

The release agent is known from experience not to affect the polymerization or the foaming operation, and solely serves to facilitate removal of the glass plates from the polymer slab.

Example 2

In this example, foaming was done with a blowing agent not a constituent part of a polymer and the amount of nucleating agent was doubled.

A mixture of 257.25 g of a polymethacrylate prepared exclusively from MMA, 1029.00 g of MMA, 0.75 g of 2,2'-azobis(2,4-dimethylvaleronitrile), 0.60 g of pentaerythritol tetrathioglycolate as chain transfer agent, 15.00 g of n-butyl acrylate, 105.00 g of tert-butyl methyl ether (MTBE), 1.50 g of Rewopol SB-DO 75 release agent and 0.90 g of ethylene glycol dimethacrylate as crosslinker was prepared. Into this mixture were then stirred 90.00 g of AEROSIL OX50 nucleating agent, by the complete addition being followed by a further 20 min of stirring and subsequent dispersing using an UltraTurrax (2 min at 3000 rpm, 1 min at 5000 rpm). This mixture was subsequently polymerized at 42° C. for 24 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 200° C. for 20 min. The mixture foamed very well and the distribution of the cells was uniform. The foam obtained had a density of about 100 kg/m$^3$ and very fine cells having an average diameter of 100 μm.

Comparative Example 1

In this comparative example, a nucleating agent was omitted for a direct comparison versus Example 1.

A mixture of 281.25 g of a polymethacrylate prepared exclusively from MMA, 1125.00 g of MMA, 0.75 g of 2,2'-azobis(2,4-dimethylvaleronitrile), 0.60 g of pentaerythritol tetrathioglycolate as chain transfer agent, 15.00 g of n-butyl acrylate, 75.00 g of tert-butyl methacrylate, 1.50 g of Rewopol SB-DO 75 release agent and 0.90 g of ethylene glycol dimethacrylate as crosslinker was prepared. This mixture was subsequently stirred for 20 min. This mixture was subsequently polymerized at 42° C. for 24 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 215° C. for 1 hour. The mixture foamed very well. However, the distribution of the cells was nonuniform and the cells were coarse. Average cell diameter in the foam obtained was about 2000 μm.

Comparative Example 2

In this comparative example, a nucleating agent was omitted for a direct comparison versus Example 2.

A mixture of 281.25 g of a polymethacrylate prepared exclusively from MMA, 1125.00 g of MMA, 0.75 g of 2,2'-azobis(2,4-dimethylvaleronitrile), 0.60 g of pentaerythritol tetrathioglycolate as chain transfer agent, 15.00 g of n-butyl acrylate, 75.00 g of tert-butyl methyl ether (MTBE), 1.50 g of Rewopol SB-DO 75 release agent and 0.90 g of ethylene glycol dimethacrylate as crosslinker was prepared. This mixture was subsequently stirred for 20 min. This mixture was subsequently polymerized at 42° C. for 24 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 215° C. for 1 hour. The mixture foamed very well. However, the distribution of the cells was nonuniform, and the foam was extremely inhomogeneous and coarsely cellular. Average cell diameter in the foam obtained was significantly above 2000 μm.

Comparative Example 3

In this comparative example, the nucleating agent used for a direct comparison versus Example 2 was not in accordance with the present invention.

A mixture of 272.25 g of a polymethacrylate prepared exclusively from MMA, 1089.00 g of MMA, 0.75 g of 2,2'-azobis(2,4-dimethylvaleronitrile), 0.60 g of pentaerythritol tetrathioglycolate as chain transfer agent, 15.00 g of n-butyl acrylate, 75.00 g of tert-butyl methyl ether (MTBE), 1.50 g of Rewopol SB-DO 75 release agent and 0.90 g of ethylene glycol dimethacrylate as crosslinker was prepared. Into this mixture were then stirred 45.00 g of Finntalc M03-AW (a talcum powder) nucleating agent, by the complete addition being followed by a further 20 min of stirring and subsequent dispersing using an UltraTurrax (2 min at 3000 rpm, 1 min at 5000 rpm). This mixture was subsequently polymerized at 42° C. for 24 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 215° C. for 1 hour. The mixture foamed extremely slowly and nonuniformly. Furthermore, the distribution of the cells was nonuniform, and the foam was extremely inhomogeneous and coarsely cellular. Average cell diameter in the foam obtained was about 2000 μm.

The invention claimed is:

1. A process for producing a polymethacrylate foam, polymerizing a composition comprising:
   from 0.01 to 2.0 wt % of an initiator,
   from 2 to 20 wt % of a blowing agent selected from the group consisting of urea, tert-butyl (meth)acrylate, isopropyl (meth)acrylate, tert-butyl methyl ether, and poly(tert-butyl (meth)acrylate),
   from 0.2 to 10 wt % of silicon oxide particles having a diameter between 4 and 1000 nm as nucleating agent and from 70 to 97.79 wt % of a polymer-forming mixture,
   wherein said polymer-forming mixture comprises:
   methyl methacrylate (MMA) and/or MMA repeat units to an extent of not less than 75 mol % and may be present as polymer and/or oligomer to an extent of from 0 to 80 wt %, wherein said polymerizing proceeds at a temperature between 20° C. and 100° C., to obtain a polymerized composition, and
   subsequently foaming said polymerized composition at a temperature between 130° C. and 250° C. to obtain a rigid polymethacrylate foam.

2. The process according to claim 1, wherein the composition contains from 0.5 to 8 wt % of $SiO_2$ particles having a diameter between 5 and 500 nm.

3. The process according to claim 1, wherein the composition contains from 0.2 to 1.5 wt % of the initiator, from 3 to 15 wt % of the blowing agent, from 0.5 to 8 wt % of $SiO_2$ particles and from 75 to 97.8 wt % of the polymer-forming mixture, wherein said polymer-forming mixture consists of MMA to an extent of not less than 75 mol % and is present as polymer and/or oligomer to an extent of from 0 to 50 wt %.

4. The process according to claim 1, wherein the temperature is between 30° C. and 70° C. for the polymerization and between 150° C. and 230° C. for the foaming.

5. The process according to claim 1, wherein the polymer-forming composition further comprises up to 0.5 wt % of crosslinker and/or up to 1.5 wt % of chain transfer agent.

6. The process according to claim 1, wherein the polymer-forming mixture comprises MMA-copolymerizable comonomers and/or -copolymerized comonomers in the polymers and/or oligomers, and
   wherein the comonomers comprise (meth)acrylic acid, methyl acrylate, ethyl (meth)acrylate, propyl (meth)acrylate, n-butyl (meth)acrylate, tert-butyl (meth)acrylate, isopropyl (meth)acrylate, isobutyl (meth)acrylate, styrene, (meth)acrylamide, an N-alkyl(meth)acrylamide having one to 12 carbon atoms in the alkyl group, a hydroxyalkyl (meth)acrylate having one to 4 carbon atoms in the alkyl group or mixtures of two or more thereof.

7. The process according to claim 1, wherein the polymerization and/or the foaming are/is effected stagewise at different temperatures.

8. The process according to claim 1, wherein the polymerization and the foaming are effected simultaneously.

9. The process according to claim 1, wherein when the blowing agent comprises isopropyl (meth)acrylate and/or tert-butyl (meth)acrylate the isopropyl (meth)acrylate and/or tert-butyl (meth)acrylate are/is at the same time part of the polymer-forming mixture and are wholly or partly copolymerized into the polymers formed therefrom.

* * * * *